United States Patent [19]

New

[11] 4,393,468
[45] Jul. 12, 1983

[54] BIT SLICE MICROPROGRAMMABLE PROCESSOR FOR SIGNAL PROCESSING APPLICATIONS

[75] Inventor: Bernard J. New, Los Gatos, Calif.

[73] Assignee: Advanced Micro Devices, Inc., Sunnyvale, Calif.

[21] Appl. No.: 247,675

[22] Filed: Mar. 26, 1981

[51] Int. Cl.³ .............................................. G06F 13/00
[52] U.S. Cl. .................................. 364/736; 364/726; 364/200
[58] Field of Search ............... 364/736, 726, 712, 716, 364/200, 900

[56] References Cited

U.S. PATENT DOCUMENTS

| | | | |
|---|---|---|---|
| 3,812,470 | 5/1974 | Murtha et al. | 364/736 X |
| 3,988,717 | 10/1976 | Kisylia | 364/200 |
| 4,025,771 | 5/1977 | Lynch, Jr. et al. | 364/736 |
| 4,179,734 | 12/1979 | O'Leary | 364/200 |
| 4,224,676 | 9/1980 | Appelt | 364/712 |
| 4,275,452 | 6/1981 | White | 364/726 |

Primary Examiner—David H. Malzahn
Attorney, Agent, or Firm—Gary T. Aka; J. Ronald Richbourg

[57] ABSTRACT

A programmable device for signal processing applications in which short loops of digital data are processed repetitively and in parallel. The device consist of five independently programmable subsystems whose functions are able to operate simultaneously. The apparatus is intended for use in a connection with a digital multiplier device and a digital memory device for such signal processing applications as fast Fourier transforms and time domain filtering in real time or near real time. The five parallel functions are 1. to move data in and out of an external memory device between selected registers;
2. to move data in and out of an external multiplier between selected registers and an arithmetic logic unit (ALU);
3. to move data from the output of a multiplier to selected registers and to the ALU;
4. to propagate data selectively through a chain of registers, the chain being of preselectable length; and
5. to perform selected arithmetic and logic operations.

The device is provided with an instruction set capable of completely defining any of the five simultaneously allowable functions. The device structure is modular to permit expansion of data word length at the ALU. Internally generated control bit signals are capable of explicitly forcing a carry or inhibiting a carry, thereby to permit independent parallel operation or extended word length operation under program control. The entire apparatus is intended to be embodied as an integrated circuit in a single chip of semiconductor material.

11 Claims, 10 Drawing Figures

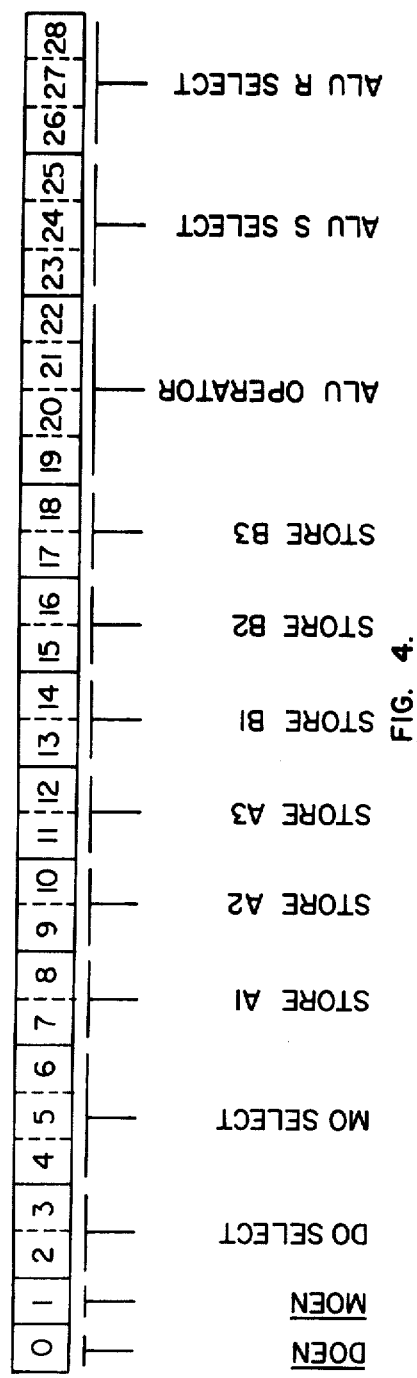

R

| $I_{26}$ | $I_{27}$ | $I_{28}$ | |
|---|---|---|---|
| 0 | 0 | 0 | A1 |
| 1 | 0 | 0 | A2 |
| 0 | 1 | 0 | A3 |
| 1 | 1 | 0 | B1 |
| 0 | 0 | 1 | B2 |
| 1 | 0 | 1 | B3 |
| 0 | 1 | 1 | $SE_{IN}$ |
| 1 | 1 | 1 | 0 |

S

| $I_{23}$ | $I_{24}$ | $I_{25}$ | |
|---|---|---|---|
| 0 | 0 | 0 | A1 |
| 1 | 0 | 0 | A2 |
| 0 | 1 | 0 | A3 |
| 1 | 1 | 0 | B1 |
| 0 | 0 | 1 | B2 |
| 1 | 0 | 1 | B3 |
| 0 | 1 | 1 | MSP |
| 1 | 1 | 1 | LSP |

FIG. 6.

| $I_4$ | $I_5$ | $I_6$ | |
|---|---|---|---|
| 0 | 0 | 0 | A1 |
| 1 | 0 | 0 | A2 |
| 0 | 1 | 0 | A3 |
| 1 | 1 | 0 | B1 |
| 0 | 0 | 1 | B2 |
| 1 | 0 | 1 | B3 |
| 0 | 1 | 1 | ALU |
| 1 | 1 | 1 | DIO |

FIG. 8.

| $I_{21}$ | $I_{22}$ | $I_{19}$ | $I_{20}$ | OP | $C_{OUT}$ | $\overline{P}$ | $\overline{G}$ |
|---|---|---|---|---|---|---|---|
| 0 | 0 | 0 | 0 | R+S | CARRY | $\overline{PROP}$ | $\overline{GEN}$ |
| 1 | 0 | | | R−S | | | |
| 0 | 1 | | | R | | | |
| 1 | 1 | | | S−R | | | |
| 0 | 0 | 1 | 0 | R+S | 0 | 1 | 1 |
| 1 | 0 | | | R−S | | | |
| 0 | 1 | | | R | | | |
| 1 | 1 | | | S−R | | | |
| 0 | 0 | 0 | 1 | R+S | 1 | 0 | 0 |
| 1 | 0 | | | R−S | | | |
| 0 | 1 | | | R | | | |
| 1 | 1 | | | S−R | | | |
| 0 | 0 | 1 | 1 | R.XOR.S | 0 | 1 | 1 |
| 1 | 0 | | | R.AND.S | | | |
| 0 | 1 | | | $\overline{R}$ | | | |
| 1 | 1 | | | R.OR.S | | | |

FIG. 7.

| $I_2$ | $I_3$ | |
|---|---|---|
| 0 | 0 | A2 |
| 1 | 0 | A3 |
| 0 | 1 | B2 |
| 1 | 1 | B3 |

FIG. 9.

| CYCLE | DIO | ALU | REAL |||||| ALU | IMAGINARY |||||| MULTIPLIER ||
|---|---|---|---|---|---|---|---|---|---|---|---|---|---|---|---|---|---|
| | | | A1 | A2 | A3 | B1 | B2 | B3 | | A1 | A2 | A3 | B1 | B2 | B3 | MIO | MULT |
| 0 | | | | | | | | | | | | | | | | | |
| 1 | | | | | | | | | | | | | | | | | |
| 2 | | | | | | | | | | | | | | | | | |
| 3 | READ B | | | | | DIO | | | | | | | | | | | |
| 4 | READ A | | DIO | | | | | | | | | | | | | $B_R$ | |
| 5 | | $A_1-MI$ | | | MI | | | | | | | | DIO | | | $B_I$ | $B_R W_R$ |
| 6 | | $A_1+A_3$ | | ALU | | | ALU | | | | DIO | | | | | | $B_R W_I$ |
| 7 | | $B_2+MI$ | | | | MI | ALU | | | $A_1-MI$ $B_2 MI$ | | ALU | | MI | | | $B_I W_R$ |
| 8 | WRITE B2 | $A_2-B_1$ | | ALU | | | | | | $A_1+B_3$ $A_2+A_3$ | | | | | ALU | MI | | $B_I W_I$ |
| 9 | WRITE A2 | | | | | | | | | | | | | | | | | |
| 10 | | | | | | | | | | | | | | | | | | |
| 11 | | | | | | | | | | | | | | | | | | |
| 12 | | | | | | | | | | | | | | | | | | |
| 13 | | | | | | | | | | | | | | | | | | |
| 14 | | | | | | | | | | | | | | | | | | |
| 15 | | | | | | | | | | | | | | | | | | |

FIG. 10

BIT SLICE MICROPROGRAMMABLE PROCESSOR FOR SIGNAL PROCESSING APPLICATIONS

BACKGROUND OF THE INVENTION

1. Field of the Invention

This invention relates to digital signal processing and more particularly it relates to a device capable of performing specific arithmetic and logic functions required to perform various types of waveform signal processing tasks including transforms known collectively as fast Fourier transforms (FFT).

Fast Fourier transforms are a class of processes which are capable of performing Fourier transformation of signals with considerably fewer multiplication operations than normally is required for Fourier transformation. For example, direct evaluation of a discrete Fourier transform on N number of points requires $N^2$ complex multiplications and additions. A fast Fourier transform requires only $(N/2) \log_2 N$ number of computations. For an $N = 1024$ points, this represents a computational savings of ninety-nine percent.

The fast Fourier transform is characterized by a large number of repetitive sequential operations of complex (real and imaginary) numbers in short loops. It is desirable to perform such computations as rapidly as possible to accommodate a broad spectrum of frequencies in real time applications where manipulation of the information in the transform domain is particularly convenient.

2. Description of the Prior Art

In the past, general purpose computers and bit slice machines have been adapted for waveform signal processing applications. General purpose computers, however, are generally expensive and have many unnecessary or limited functions when used in signal processing applications, specifically signal processing applications which approach real time speeds. The number of multiplications, data transfers, and the like, which must be performed during each sample period is extremely large, and the processing time is generally limited by the critical path of the central processing unit. For example, a typical bit slice-type central processing unit is the Am2903 Arithmetic Processor manufactured by Advanced Micro Devices, Inc. of Sunnyvale, Cal. The central element, the AM2903, contains an arithmetic logic unit and a 16-word scratch-pad memory with special multiply functions. However, the Am203 has a critical path which only permits the efficient implementation of a microprogrammed multiplication in a multicycle operation. It is therefore necessarily slower than a device capable of parallel hardware multiplication. Still further, the architecture of the Am2903 has only one arithmetic logic unit and one data bus. Thus a critical path time restraint exists if it is necesary to manipulate complex numbers, since two cycles are required for each such operation. Still further, the A2903 does not easily permit simultaneous memory access and arithmetic operation, thus establishing another critical path.

What is needed is a device capable of a high degree of parallel processing. Indeed, it is only by performing many operations in parallel that really high processing throughput may be achieved. The input/output structure of existing devices, including the Am2903 simply do not provide for the necessary interconnection, or flexibility of interconnection, between computational elements, storage elements and external devices to minimize critical path.

SUMMARY OF THE INVENTION

According to the invention a programmable device is provided for digital signal processing applications in which short loops of digital data are processed repetitively and in parallel. The device is a structure, typically on a single silicon chip, comprising storage registers and an arithmetic logic unit with suitable multiplexers to permit a high degree of flexibility in direct interconnection of the registers, the arithmetic logic unit, and external devices such as a multiplier and external memory. The device consists of five independently programmable subsystems where functions are able to operate simultaneously in conjunction with a multiplier device, a memory device, and a source of program instructions. The five functions are: (1) to move data in and out of an external memory device between preselected registers; (2) to move data in and out of an external multiplier beween the preselected registers and an arithmetic logic unit (ALU); (3) to move data from the output of an external multiplier to preselected registers and to the ALU; (4) to propagate data selectively through a chain of registers, the chain being of preselectable length; and (5) to perform selected arithmetic and logic operations.

An instruction set is defined for the device according to the invention which is capable of completely specifying any of the five simultanelusly allowable operations. The apparatus is constructed in manner permitting modular expansion of data word length at the arithmetic logic unit by the use of control bits capable of explicitly forcing a carry or inhibiting a carry, thereby to permit independent parallel operation of the arithmetic logic unit or extended word length operation under program control.

The invention will be best understood by reference to the following detailed description taken in connection with the accompanying drawings.

BRIEF DESCRIPTION OF THE DRAWINGS

FIG. 4 is chart illustrating the control word of the device according to the invention.

FIG. 5 is a set of six tables defining the instructions for six independent registers of the device according to the invention.

FIG. 6 is a set of two tables defining the arithmetic logic unit operand select instructions for the apparatus according to the invention.

FIG. 7 is a table defining the arithmetic logic unit operation instructions for the device according to the invention.

FIG. 8 is a table defining the instructions for the Multiplier Output (MO) multiplexer for the device according to the invention.

FIG. 9 is table defining the data input/output (DIO) instructions for the device according to the invention.

FIG. 10 is a table illustrating a single computation cycle of one type of fast Fourier transform butterfly operation for devices according to the invention in the form of structure shown in FIG. 2.

DETAILED DESCRIPTION OF SPECIFIC EMBODIMENTS

Figure 1:
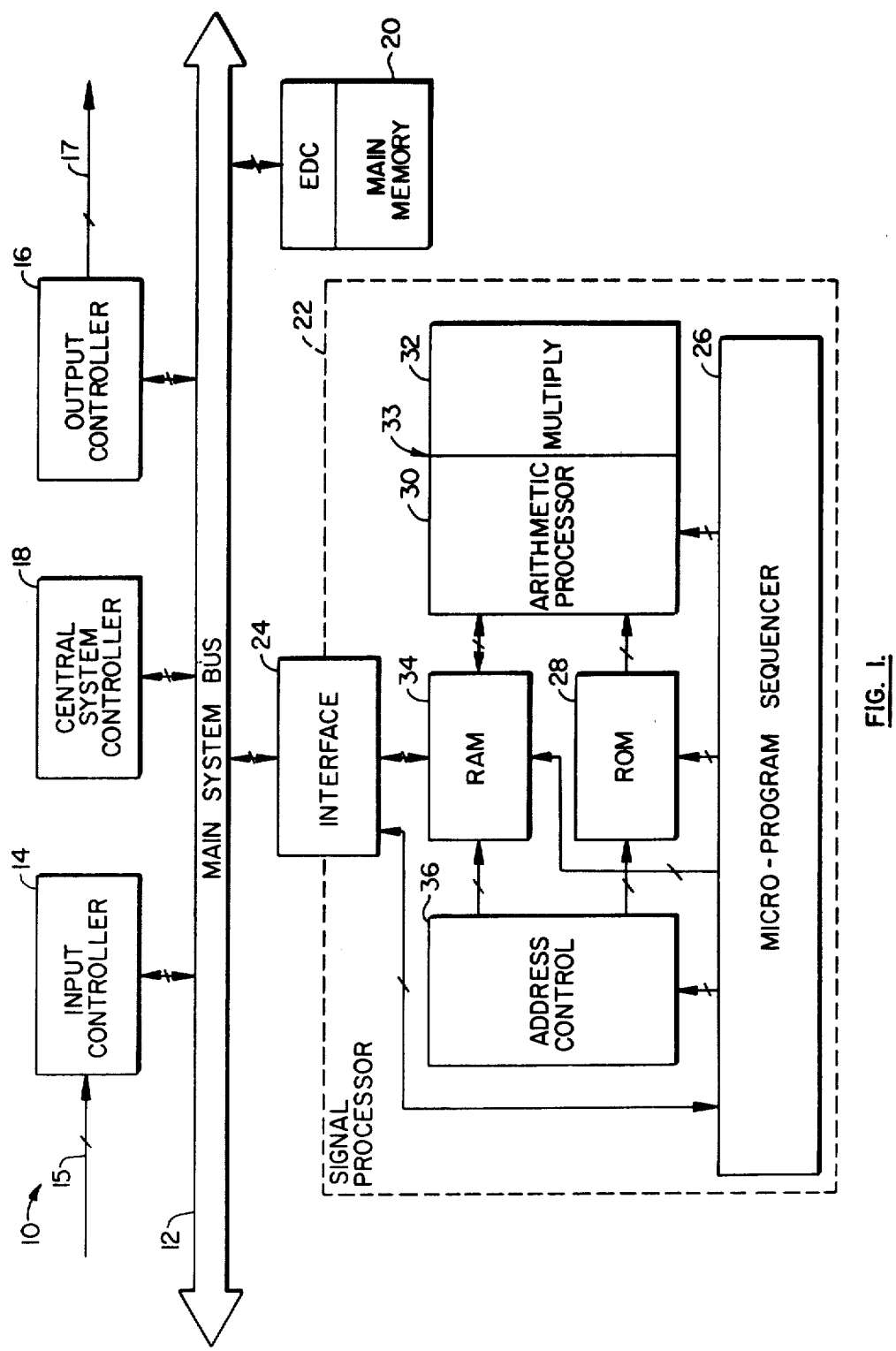
FIG. 1 is a block diagram of a digital computer system to which is coupled a signal processing system.

The subject invention is intended for use as a bit-slice arithmetic logic unit and register stack for fast Fourier transform generators which process digital signals representative of analog waveforms in digital form. One representative environment is a computer system 10 (FIG. 1). In the computer system 10, there are typically a main system bus 12 which interconnects various system elements, such as an input controller 14, with its associated input devices (not shown) coupled thereto by a suitable connection 15, an output controller with its associated output devices (not shown) coupled thereto by an associated connection 17, a central system controller 18, which incorporates a central processing unit, and a main memory 20, with its control interface.

According to the invention, there is at least one special function device, such as a signl processor 22, which is coupled to the main system bus 12. The signal processor 22 may for example perform fast Fourier transforms in response to a specific instruction word signal applied to the system bus 12.

An interface 24 connects a signal processor 22 with the main system bus 12 and provides all necessary data, address and control information transfer functions for the signal processor 22. The signal precessor 22 is itself a small special purpose computing machine which is capable of rapidly generating digital signals representative of the results of its special purpose computation.

The signal processor 22 typically includes a microprogram sequencer 26, a read only memory (ROM) 28, a random access memory (RAM) 34, an address control device or address sequencer 36, and a special purpose complex number processor 33, as hereinafter explained, which comprises an arithmetic processor with a dedicated high-speed parallel multiply function device.

The microprogram sequencer 26 is coupled to the interface 24, the address control 36, the ROM 28 and the number processor 33. The microprogram sequencer 26 provides the microcode instructions, initial parameters and clock to the address control 36 and to the other devices of the signal processor 22. The ROM 28 contains data representing at least a portion of the constants used in the signal processor 22. The RAM 34 is for storage of input and output data and for so-called "scratch pad" storage of data generated during computation by the number processor 33.

The RAM 34 is coupled to the address control 36, as well as to and from the interface 24 and to and from the number processor 33.

Figure 2:
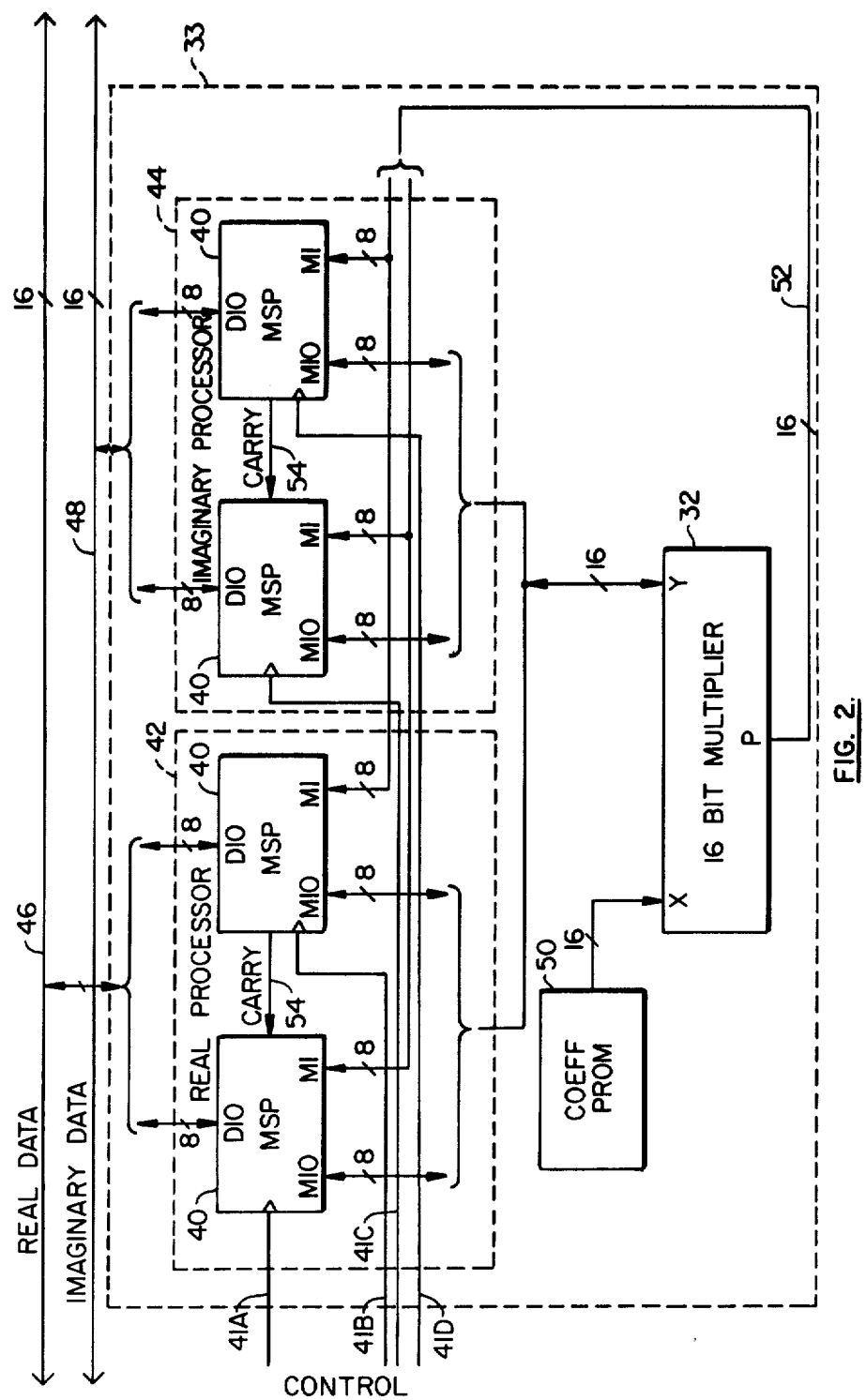
FIG. 2 is a block diagram of an arithmetic processor and a multiplier in which modular devices according to the invention are employed.

Referring to FIG. 2 there is shown a block diagram of a number processor 33 in which a plurality of devices according to the invention, hereinafter bit-slice processors 40, are employed. The architecture of FIG. 2 is but one example of the use of the bit-slice processors 40 according to the invention. The number processor 33 (FIG. 2) comprises a real processor portion 42 and an imaginary processor portion 44, with data input/output terminals of the real processor 42 coupled to an interconnection for real data 46 and the data input/output terminals of the imaginary processor 44 coupled to a bus for imaginary data 48. The number processor 33 further includes, for example, a 16-bit high-speed multiplier 32 having one operand input coupled to a programmable read only memory (PROM) 50 and the other operand input coupled to a multiplier input/output terminal of both the real processor 42 and the imaginary processor 44. The multiplier 32 may for example be a type MPY-16HJ 16×16 bit parallel multiplier manufactured by TRW, Inc. of Los Angeles, Cal. Other high-speed parallel array multipliers may also be used. The product of the multiplier 32 is fed through a bus 52 to the multiplier inputs of the real processor 42 and the imaginary processor 44. Specifically, for a 16-bit output of the most significant product, one 8-bit portion is coupled to one 8-bit input of one bit-slice processor 40 of the imaginary processor and to fhe corresponding 8-bit input of a bit-slice processor 40 of the real processor, while the other 8-bit output is (the most significant eight bits) is coupled to one 8-bit input of the more significant bit-slice processor 40 of the imaginary processor 44 and also to the same bit inputs of the more significant bit-slice processor 40 of the real processor 42. The bit-slice processors 40 are appended to each other in parallel by a carry flag line 54 (including other flags) between each bit-slice processor 40 forming a processor unit. Each bit-slice processor is under independent or interdependent control of external microcode through control buses 41A, 41B, 41C and 41D. It is thus seen that the bit-slice processor 40 is a basic building block of a number processor 33. The architecture of FIG. 2 is one example of a parallel processor which can be used with a complex number system. Other architectures are suggested by the modular structure and capabilities of the bit-slice processor 40.

Figure 3:
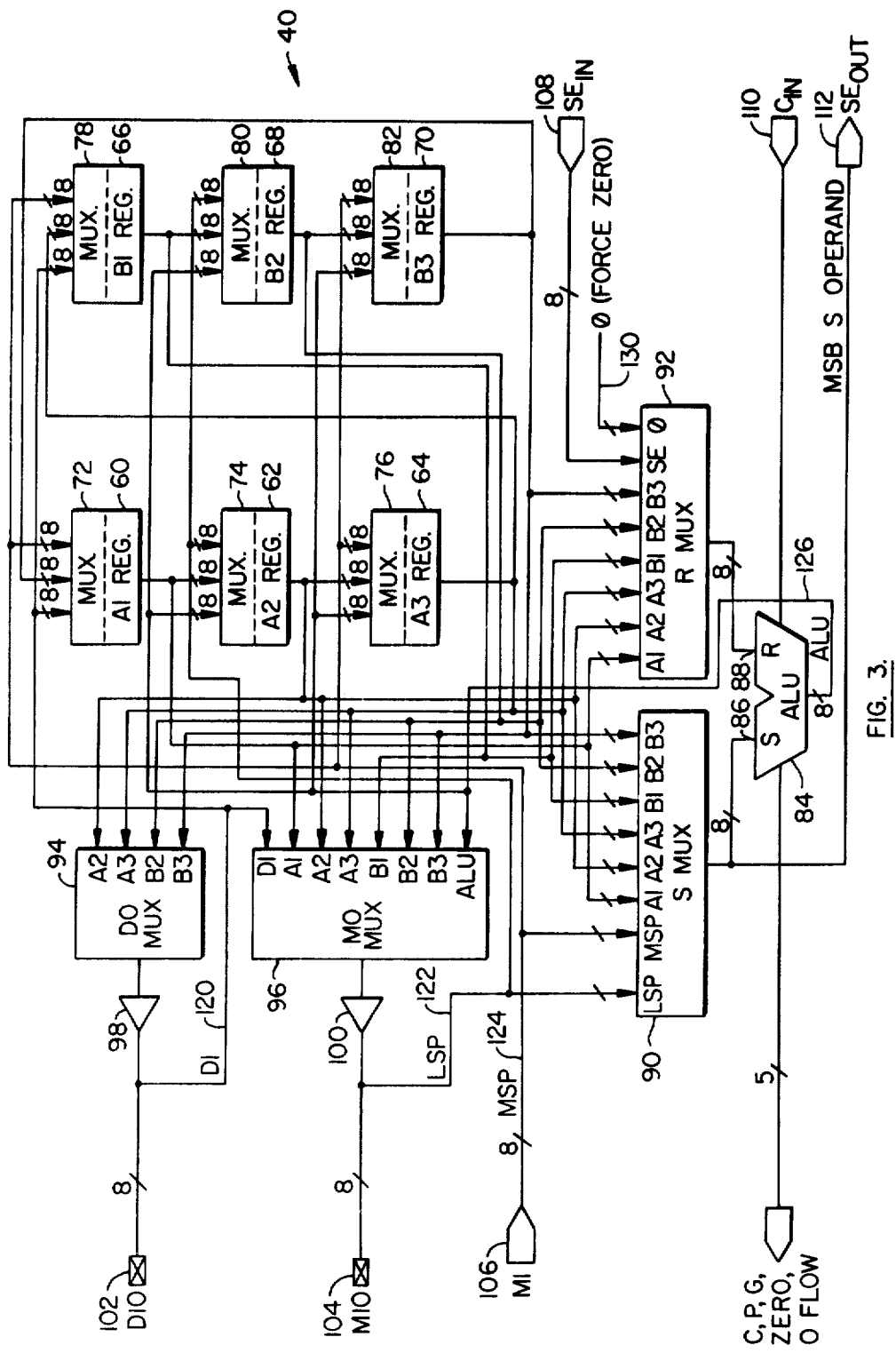
FIG. 3 is a schematic diagram of a device according to the invention.

Turning to FIG. 3, each bit-slice processor 40 consists of a register/arithmetic logic unit module in integrated circuit form having an internal architecture with the specific intention of providing a high degree of parallelism and flexibility. The bit-slice processor 40 comprises six registers 60, 62, 64, 66, 68 and 70, each of which has an associated three-channel register multiplexer 72, 74, 76, 78, 80 and 82. Two of the registers 60, 66 serve as input registers. The registers 60. 62, 64, 66, 68, 70 are arranged in a stack forming a loop which can be entered or exited at any register. The input registers 60, 66 are spaced equidistant from one another, allowing the register stack to be programmed as two independent parallel stacks, as one loop of registers or as a single stack of registers with one input and one output.

In addition, there is provided an arithmetic logic unit 84 with two operand input terminals 86 and 88 called, respectively, the S input and the R input. An S input multiplexer 90, an R input multiplexer 92, a data output multiplexer 94, a multiplier output multiplexer 96 and output drivers 98 and 100 constitute the interconnections. In addition, the bit-slice processor 40, which is structured as an 8-bit slice, includes the following external connections: an 8-bit-wide data I/O terminal (DIO) 102, an 8-bit-wide multiplier I/O terminal (MIO) 104, an 8-bit-wide multiplier input terminal (MI) 106, which is intended for use in parallel with the MIO 104 as the most significant product of the 16-bit line, a sign extend input ($SE_{IN}$) 108, a carry input ($C_{IN}$) 110, a sign extend output ($SE_{OUT}$) 112, and five bits of selected flags which are used for control of a parallel bit-slice device, namely, Carry, Propagate, Generate, Zero, and Overflow.

The data output multiplexer 94 has four inputs, the multiplier output 96 has eight inputs, the S multiplexer 90 has eight inputs, and the R multiplexer 92 has eight inputs.

The control lines for the instructions of the multiplexers and to the ALU 84, as well as the clock lines for the registers, are not shown. The device is subject to external instructional control as defined by a 29-bit instruction word which allows all registers and the ALU to be explicitly controlled by external means with each clock cycle. Various specific implementations of logic circuits according to the invention will be apparent to those of ordinary skill in the design of logic circuits once the control state and interconnections have been defined as herein disclosed.

The internal interconnections of the bit-slice processor 40 are intended to provide maximum flexibility of interconnection between the registers and the ALU 84, as well as to the external access terminals. Specifically referring to FIG. 3, all interconnections between elements are 8-bit-wide bus connections. The DIO terminal 102 has a data input (DI) bus 120 which is coupled to the DI input of the MO multiplexer 96 and also to one input of the first multiplexer 72 for the first register 60 (hereinafter the A1 register) and to one input of the fourth multiplexer 78 of the fourth register 66 (hereinafter the B1 register). The MIO terminal 104 has a multiplier input (LSP) bus 122 which is coupled to the least significant product (LSP) terminal of the S multiplexer 90, to one input of the A2 multiplexer 74 of the A2 register 62 and to one input of the B2 multiplexer 80 of the B2 register 68.

The MI terminal 106 has its bus MSP 124 coupled to the most significant product (MSP) terminal of the S multiplexer 90, to one input of the A3 multiplexer 76 of the A3 register 64, to one input of the B3 multiplexer 82 of the B3 register 70, to one input of the A1 multiplexer 72 of the A1 register 60, and to one input of the B1 multiplexer 78 of the B1 register 66. The output bus of the ALU 84, designated the ALU bus 126, is coupled to the ALU input of the MO multiplexer 96, to one input of the A3 multiplexer 76 of the A3 register 64, to one input of the B3 multiplexer 82 of the B3 register 70, to one input of the A2 multiplexer 74 of the A2 register 62 and to one input of the B2 multiplexer 80 of the B2 register 68.

The output of the A1 register 60, designated the A1 bus, is coupled to one input of the A2 multiplexer 74 of the A2 register 62, to the A1 input of the MO multiplexer 96 and to the A1 inputs of both the S multiplexer and the R multiplexer 92. The output of the A2 register 62, designated the A2 bus, is coupled to one input of the A3 multiplexer 76 of the A3 register 64, and to the A2 inputs of the DO multiplexer 94, to the MO multiplexer 96, to the S multiplexer 90 and to the R multiplexer 92. The output of the A3 register 64, designated the A3 bus is coupled to one input of the B1 multiplexer 78 of the B1 register 66, and to the A3 inputs of the DO multiplexer 94, the MO multiplexer 96, the S multiplexer 90, and the R multiplexer 92.

The output of the B1 register 66 is coupled to one input of the B2 multiplexer 80 of the B2 register 68, and to the B1 inputs of the MO multiplexer 96, the S multiplexer 90, and the R multiplexer 92. The output of the B2 register 68, designated the B2 bus, is coupled to one input of the B3 multiplexer 82 of the B3 register 70 and to the B2 inputs of the DO multiplexer 94, the MO multiplexer 96, the S multiplexer 90 and the R multiplexer 92. The output of the B3 register 70 is coupled to one inut of the A1 multiplexer 72 of the A1 register 60 and to the B3 inputs of the DO multiplexer 94, the MO multiplexer 96, the S multiplexer 90 and the R multiplexer 92.

The $SE_{IN}$ input terminals 108 are coupled to input of the R multiplexer 92, as are Force Zero input lines 130. The output of the S multiplexer is not only provided to the S input 86 of the ALU 84, but it is also provided as the MSB S operand output to the $SE_{OUT}$ terminals 112. The output of the DO multiplexer 94 is coupled through the driver 98 to the DIO output terminals 102. The output of the MO multiplexer 96 is coupled through driver 100 to the MIO output terminals 104. As will be readily apparent, the multiplexers and busses of the bit-slice processor 40 allow, in one device, typically on a chip of silicon, direct interconnection between any register and the ALU 84, a continuously recirculating register stack of six registers which can be entered and exited at virtually any point, and a structure which allows two pairs of three registers to be independently queued up. Each register may be independently controlled to load data from one of the three sources. Two of the registers, the A1 register 60 and the B1 register 66 are specifically intended for use as input registers while the other four registers are intended as accumulator registers.

The ALU 84 is provided with eight definable arithmetic and logic functions as follows: $R+S$, $R-S$, $S-R$, Pass R, R OR S, R AND S, R XOR S, and $\bar{R}$ (R inverted).

Two ports are provided to communicate with an external multiplier. The MIO terminal 104 is designed to be used with the Y port of a multiplier to load operands and to recover the least significant product (LSP). The MI terminal 106 is intended to recover the most signficant product (MSP) output of the external multiplier. The third port, the DIO terminal 102 is intended for communication with an external memory.

The bit-slice processor 40 is provided with an ability to execute instructions simultaneously and independently in five areas. These areas are as follows:

1. exchanging data between an external memory and specified internal registers as established by register multiplexer instruction signals;

2. loading of a multiplier operand from either an external multiplier or an internal register as defined by operand multiplexer instruction signals;

3. retrieving a multiplier product from an external multiplier;

4. performing an arithmetic or logic operation; and 5. moving data within a stack of registers.

Turning to FIG. 4, there is shown the structure of a 29-bit binary instruction word, which when applied at twenty-nine external terminals executes the instructions explaind hereinafter. The instruction is composed of thirteen independent disjoint microcode fields which preset the multiplexers and define the ALU operation for each microcode cycle. Specifically, Field 1 consisting of bit 0 is defined as the Data Out Enable field. Field 2, defined by bit 1 is the Multiplier Out Enable field. Field 3 defined by bits 2 and 3 is the Data Out Select field. Field 4 defined by bits 4, 5 and 6 is the Multiplier Out Select field. Field 5 defined by bits 7 and 8 is the Store A1 field for storing data in register A1. Similarly, Fields 6, 7, 8, 9 and 10 defined by bits 9 and 10, 11 and 12, 13 and 14, 15 and 16, and 17 and 18, respectively are the Store A2, Store A3, Store B1, Store B2, and Store B3 fields. Bits 19, 20, 21 and 22 define all of the ALU operations and is called the ALU Operator field. Bits 23, 24, and 25 define the ALU S Operand Select, and bits 26, 27 and 28 define the ALU R Operand Select field.

FIG. 5 defines the four states of bits $I_7$ through $I_{18}$ which specify which of three multiplexer inputs is activated associated with the registers A1, A2, A3, B1, B2, B3. A fourth state is a Hold state, a state which prevents the data from being propagated from the previous register or input into the register.

The A1 register instruction set selects the most significant product (MSP), the DI bus or bus B3, as well as Hold, in response to the $I_7$ and $I_8$ bit input applied thereto. The A2 register, responding to instruction bits $I_9$ and $I_{10}$, gates the LSP, the ALU and the A1 bus as well as Hold. The A3 register responds at bits $I_{11}$ and $I_{12}$ to enable the multiplexers for either the MSP, the ALU or the A2 bus, as well as Hold.

The B1 register, instructed as bits $I_{13}$ and $I_{14}$, is mirror image of the A1 register instructions in that it also responds to the most significant product DI bus A3 and Hold as its instruction set. Likewise, register B2 responding at bits $I_{15}$ and $I_{16}$, gates the LSP, the B1 bus and Hold, and the B3 register responds at bits $I_{17}$ and $I_{18}$ to gate the MSP, the ALU, the B2 bus and Hold.

Instruction bits $I_{26}$, $I_{27}$ and $I_{28}$ define the multiplexer gating of the R operand multiplexer and bits $I_{23}$, $I_{24}$ and $I_{25}$ are the S operand multiplexer gating (FIG. 6). The instructions for the eight different gates are, respectively, A1 bus, A2 bus, A3 bus, B1 bus, B2 bus, B3 bus, $SE_{IN}$, and Force Zero. On the S operand side, the gating instructions are A1 bus, A2 bus, A3 bus, B1 bus, B2 bus, B3 bus, MSP and LSP bus.

Bits $I_4$, $I_5$ and $I_6$ define the gating instructions for the MO multiplexer 96 which are, respectively, A1 bus, A2 bus, A3 bus, B1 bus, B2 bus, B3 bus, ALU, and DI (FIG. 8). Bits $I_2$ and $I_3$ define the multiplexer instructions for the DO multiplexer 94, which are respectively A2, A3, B2 and B3.

Bits $I_{21}$, $I_{22}$, $I_{19}$ and $I_{20}$ define the operations for the ALU 84. The states of bits $I_{19}$ and $I_{20}$ also define whether bits are set to communicate relevant information to an adjacent or parallel bit-slice processor. If bits $I_{19}$ and $I_{20}$ are always zero, a Carry Out bit issues a Carry signal (depending on the product of the ALU). Similarly, a Propagate bit and Generate bit are also set according to the product of the ALU whenever bits $I_{19}$ and $I_{20}$ are set at zero. However, when bit $I_{19}$ is set, the Carry Out is always inhibited (set to zero) and the Propagate and Generate bits are locked in a complementary state to the Carry Out signal. (In the particular design shown, the Propagate and Generate bits are negated so that they are only enabled when set to a binary zero.) When bit $I_{20}$ is set with bit $I_{19}$ at zero, the Carry Out bit is invariably enabled while the Propagate and Generate bits are also set to the complementary state, in this case they are also locked in the enable state.

Bit $I_{21}$ and $I_{22}$ in connection with bits $I_{19}$ and $I_{20}$ define the operations of the ALU. When bits $I_{19}$ and $I_{20}$ are zero, bits $I_{21}$ and $I_{22}$ define the four arithmetic operations $R + S$, $R - S$, $R$ ($R$ pass), and $S - R$, according to the four possible states of bits $I_{21}$ and $I_{22}$. The same arithmetic operations are defined when bit $I_{19}$ and $I_{20}$ are set at one and zero, respectively, and zero and one, respectively. However, when bits $I_{19}$ and $I_{20}$ are both set to one, bits $I_{21}$ and $I_{22}$ define the logical operation R XOR S, R AND S, R negate, and R OR S.

In this manner all of the states of the ALU, of the multiplexers and of the registers are fully defined by external instructions. The implementation of a structure capable of executing these logical instructions will be apparent to a designer of ordinary skill in this art, and many such structures fulfill these criteria. The order of the bits is of course irrelevant so long as the fields are independent of one another within the constraints hereinabove defined.

FIG. 10 is a table illustrating the instructional microcode which may be applied to a basic signal processor architecture of the type shown in FIG. 2 for a single fast Fourier transform butterfly operation. The specific operation implemented is the butterfly operation of the form $A' = A + BW_N^k$ and $B' = A - BW_N^k$, where A, A', B, B' and $W_N^k$ are complex numbers. The structure of the microcode is such that ten cycles are required to complete an entire read and write cycle. However, by implementing a code with the programming structure as herein disclosed, a new operation can be initiated and completed each fourth cycle. This is possible because of interleaving of the encoding to take full advantage of the parallel structure of the bit-slice processor 40. Sixteen cycles are shown numbered from 0 through 15. The multiplication microcycle shown begins with system cycle 3 with a read of the real and imaginary parts of the value B through the input bus DIO 102. An address has been presented to the external memory and the DO Enable field has been set to pass data into the bit-slice processor 40 to the B1 register of the real processor 42 (FIG. 2) and to the B1 register of the imaginary processor 44.

The computation process continues as indicated by the instructions shown in the table. The spacing of the instructions is instructive. For example, the first ALU instruction, which occurs at system cycle 6, may recur again at system cycle 10 and system cycle 14. Four instruction cycles interleave in such a manner that each parallel operation follows as closely as is possible the critical path for the butterfly multiplication.

A valuable feature of the invention, particularly with the instruction set as herein defined wherein an express command is provided to each register in order to accept a command from a previous register, is the ability to push through data in a stack, to override data in the next subsequent register, and to pull out data from any register at any time. A still further convenient and important feature is the explicit instruction for inhibiting carry. This instruction eliminates costly and unnecessary AND gates between bit-slice modules. Accordingly, the system can be changed quickly under program control from one large extended precision computing device to a plurality of smaller independently operable computing devices. A still further valuable feature of the invention is the elimination of any need for an instruction decoder. The instructions are explicitly defined. In fact, more than 500,000,000 combinations of instructions ($2^{29}$) are possible in a device with instruction words and these explicit capabilities. The instruction set is such that there are no undefined states.

The embodiment of the invention herein described has defined a bit-slice computing device which is optimized for signal processing applications, and also for vector computation applications. It is capable of carrying on five functions in parallel, and has been shown to be able to perform characteristic butterfly functions (with the exception of the specific call to memory and the multiplication) with a minimum of wasted operations, and to provide a fully explicit instruction set without undefined states. The device can be used as a module in expandable computing machines or by a simple instruction, it can be caused to operate as an independent device in parallel with other similar computing machines, depending upon the microcode input. The bit-slice device herein described is intended to be embodied on a single chip of silicon semiconductor, thereby permitting its use as a component in a wide variety of applications in larger systems. For example, the device can be used in a hardware FFT transform processor. With a typical device cycle of 100 nanoseconds, the device is capable of completing a typical FFT butterfly operation once each 400 nanoseconds.

The invention has now been described with reference to a specific embodiment. Other embodiments will be apparent to those of ordinary skill in the art in light of this disclosure. Accordingly, it is not intended that this invention be limited except as indicated by the appended claims.

What is claimed is:

1. An integrated circuit device for processing digital data in response to instruction signals in connection with a digital memory means and multiplier means, said device comprising:
    a plurality of storage registers for storing said data;
    an arithmetic logic unit for performing preselectable arithmetic and logic operations on said data in response to said instruction signals;
    first means for selectively coupling said digital memory means and preselectable ones of said storage registers for moving data between said memory means and said preselected storage registers in response to said instruction signals;
    second means for selectively coupling preselectable ones of said storage registers and said arithmetic logic unit to said multiplier means for moving data from said preselected storage registers and said arithmetic logic unit to said multiplier means in response to said instruction signals;
    third means for selectively coupling said multiplier means to preselectable ones of said storage register means and said arithmetic logic unit for moving data from said multiplier means to said preselected storage registers and said arithmetic logic means in response to said instruction signals; and
    fourth means for selectively coupling preselectable ones of said storage registers for moving data through said preselected storage registers in response to said instruction signals,
    wherein said first, second, third and fourth selective coupling means and said arithmetic logic unit are simultaneously operable in response to said instruction signals.

2. The device according to claim 1 wherein each of said storage registers is capable of selectively holding data currently therein against erasure responsive to said instruction signals.

3. The device according to claim 2 wherein said arithmetic logic unit is responsive to said instruction signals to selectively issue or inhibit a carry signal indicating overflow of a most significant bit.

4. The device according to claim 3 wherein said arithmetic logic unit is further operative in response to an external instruction to produce a zero value data output signal.

5. An integrated circuit device for processing digital data in response to instruction signals for use in connection with digital memory means for storing data and external multiplier means, said device comprising:
    a plurality of storage registers for storing said data, each one of said storage registers having associated therewith a register multiplexer for controlling access thereto from at least one other of said storage registers and at least one other source of data, said plurality of storage registers being interconnected with one another through said associated register multiplexers so that said storage registers are coupled together responsive to said instruction signals in a single register stack, a plurality of parallel independent register stacks, or a loop of registers;
    an arithmetic logic unit operative to perform preselectable arithmetic and logic operations on data applied at a first operand input terminal and at a second operand input terminal, said arithmetic logic unit having connected thereto a first operand multiplexer for controlling access to said first operand input terminal and a second operand multiplexer for controlling access to said second operand input terminal, said first operand multiplexer and said second operand multiplexer being connected to the output of each one of said storage registers, and at least one of said operand multiplexers being connected to receive input from said multiplier means;
    first output multiplexer means for preselectably multiplexing output data from each one of said storage registers, from said arithmetic logic unit, and from said memory means to said multiplier means; and
    second output multiplexer means for preselectably multiplexing output data from at least two of said storage registers to said memory means,
    wherein said storage registers with associated register multiplexers, said arithmetic logic unit with associated operand multiplexers, said first output multiplexer means and said second output multiplexer means are all simultaneously operable in response to said instruction signals for high-speed, parallel operation.

6. The device according to claim 5 wherein each one of said storage registers is capable of selectively holding data currently therein against erasure responsive to said instruction signals.

7. The device according to claim 6 wherein said arithmetic logic unit is responsive to said instruction signals to selectively issue or inhibit a carry signal indicating overflow of a most significant bit of said arithmetic logic unit.

8. The device according to claim 6 wherein said arithmetic logic unit furtther includes means operative to generate signals indicative of Propagate, Generate, Zero, and Overflow depending on the result of arithmetic and logic operations in said arithmetic logic unit.

9. The device according to claim 5 wherein, responsive to said instruction signals, a first one of said associated register multiplexers couples said digital memory means to a first one of said storage registers for receiving data from said memory means, a second one of said associated register multiplexers couples said multiplier means to a second one of said storage registers for receiving data from said multiplier means, a third one of said associated register multiplexers couples said first one of said storage registers to a third one of said storage registers for receiving data from said first storage register, a fourth one of said associated register multiplexers couples said second one of said storage registers to a fourth one of said storage register for receiving data from said second storage register, said first register multiplexer couples said fourth storage register to said first storage register for receiving data from said fourth storage register, said second storage register multiplex couples said third storage register to said second storage register for receiving data from said third storage register whereby said device operates to provide a data loop for recirculating data from two external input sources.

10. An integrated circuit device for storing and propagating digital data in response to instruction signals in connection with digital memory means, said device comprising:
  a plurality of storage registers, each storage register having a register multiplexer, at least two input terminals, and an output terminal, said multiplexer capable of selectively coupling one of said input terminals to said storage register responsive to said instruction signals, at least one input terminal of each storage register connected to an output terminal of another storage register so that, responsive to instruction signals, said plurality of storage registers are selectively coupled in the following manner:
  (a) in a single sequence of registers wherein data is propagated through said register sequence, data introduced through an input terminal of a first one of said storage registers and data removed through an output terminal of a last one of said storage registers; and
  (b) in a loop of storage registers wherein the data from a last one of said storage registers is propagated to a first one of said storage registers.

11. The device according to claim 10 wherein said storage registers are each capable of selectively holding data currently in said storge registers against erasure responsive to said instruction signals.

* * * * *